(12) United States Patent
Veening et al.

(10) Patent No.: US 10,900,132 B2
(45) Date of Patent: Jan. 26, 2021

(54) NEUTRALIZATION IN ELECTRO-CHEMICAL ACTIVATION SYSTEMS

(71) Applicant: Diversey, Inc., Fort Mill, SC (US)

(72) Inventors: Jan Eduard Veening, Ijsselstein (NL); Lambertus Gerardus Petrus van der Heijden, Bunnik (NL)

(73) Assignee: Diversey, Inc., Fort Mill, SC (US)

( * ) Notice: Subject to any disclaimer, the term of this patent is extended or adjusted under 35 U.S.C. 154(b) by 20 days.

(21) Appl. No.: 16/478,157

(22) PCT Filed: Jan. 25, 2018

(86) PCT No.: PCT/US2018/015144
§ 371 (c)(1),
(2) Date: Jul. 16, 2019

(87) PCT Pub. No.: WO2018/140551
PCT Pub. Date: Aug. 2, 2018

(65) Prior Publication Data
US 2019/0368059 A1    Dec. 5, 2019

Related U.S. Application Data

(60) Provisional application No. 62/450,677, filed on Jan. 26, 2017.

(51) Int. Cl.
*C25B 9/08*    (2006.01)
*C02F 1/461*    (2006.01)
(Continued)

(52) U.S. Cl.
CPC .............. *C25B 9/08* (2013.01); *C02F 1/4618* (2013.01); *C25B 1/26* (2013.01); *C25B 15/02* (2013.01);
(Continued)

(58) Field of Classification Search
CPC .. C25B 9/08; C25B 1/26; C25B 15/02; C25B 11/035; C25B 1/46; C25B 9/06;
(Continued)

(56) References Cited

U.S. PATENT DOCUMENTS 3,728,245 A    4/1973 Preis et al.
3,899,403 A    8/1975 Cook, Jr. et al.
(Continued)

FOREIGN PATENT DOCUMENTS

EP    1916225    4/2008
EP    2172581    4/2010
(Continued)

OTHER PUBLICATIONS

International Search Report and Written Opinion for PCT/US2018/023499, dated Nov. 28, 2018, 10 pages.
(Continued)

*Primary Examiner* — Arun S Phasge
(74) *Attorney, Agent, or Firm* — Bell & Manning, LLC; N. Meredith Porembski

(57) ABSTRACT

A neutralization cell is provided which may be used to increase a pH level of a chlorine solution. The neutralization cell includes a neutralization anode, a neutralization cathode, an inlet, and an outlet. The neutralization anode and the neutralization cathode are positioned to divide the neutralization cell into a middle area between the neutralization anode and the neutralization cathode, an anode area on a side of the neutralization anode furthest from the neutralization cathode, and a cathode area on a side of the neutralization cathode furthest from the neutralization anode. The inlet directs the chlorine solution into the neutralization cell by directing an incoming flow of the chlorine solution into the anode area. The outlet directs the chlorine solution out of the
(Continued)

neutralization cell by directing an outgoing flow of the chlorine solution from the cathode area.

20 Claims, 10 Drawing Sheets

(51) Int. Cl.
    *C25B 1/26*         (2006.01)
    *C25B 15/02*       (2006.01)
    *C25B 11/03*       (2006.01)

(52) U.S. Cl.
CPC .............. *C02F 2001/4619* (2013.01); *C02F 2001/46133* (2013.01); *C02F 2001/46161* (2013.01); *C02F 2201/46115* (2013.01); *C02F 2209/06* (2013.01); *C02F 2301/08* (2013.01); *C02F 2307/12* (2013.01); *C25B 11/035* (2013.01)

(58) Field of Classification Search
CPC ................ C25B 15/08; C02F 1/4618; C02F 2001/46133; C02F 2001/46161; C02F 2001/4619; C02F 2201/46115; C02F 2209/06; C02F 2301/08; C02F 2307/12; C02F 2001/46142; C02F 2001/46157; C02F 1/4674
See application file for complete search history.

(56) References Cited

U.S. PATENT DOCUMENTS

| | | | |
|---|---|---|---|
| 4,201,756 A | 5/1980 | Coe et al. | |
| 4,767,511 A | 8/1988 | Aragon | |
| 5,466,347 A | 11/1995 | Shimamum et al. | |
| 5,938,916 A | 8/1999 | Bryson et al. | |
| 5,997,717 A | 12/1999 | Miyashita et al. | |
| 6,228,251 B1 | 5/2001 | Okazaki | |
| 6,251,259 B1 | 6/2001 | Satoh et al. | |
| 6,547,947 B1 | 4/2003 | Uno et al. | |
| 7,238,272 B2 | 7/2007 | Sano | |
| 9,533,897 B2 | 1/2017 | Buitendag et al. | |
| 9,546,427 B2 | 1/2017 | Lumetta | |
| 2004/0124094 A1 | 7/2004 | Bo et al. | |
| 2006/0088498 A1 | 4/2006 | Martin et al. | |
| 2010/0065421 A1 | 3/2010 | Bohnstedt | |
| 2012/0085658 A1 | 4/2012 | Bhavaraju et al. | |
| 2012/0145537 A1 | 6/2012 | Kuiphoff | |
| 2013/0341200 A1 | 1/2013 | McCormick et al. | |
| 2013/0146473 A1 | 6/2013 | Lambert et al. | |
| 2013/0168260 A1 | 7/2013 | Scherson | |
| 2014/0014145 A1 | 1/2014 | Xia et al. | |
| 2014/0124377 A1 | 5/2014 | Joynt | |
| 2014/0246308 A1 | 9/2014 | Lim | |
| 2016/0194770 A1 | 7/2016 | Yokota et al. | |
| 2017/0121832 A1* | 5/2017 | Albrecht | C25B 9/206 |
| 2017/0217799 A1 | 8/2017 | Hanaoka | |
| 2017/0298552 A1 | 10/2017 | Arai et al. | |
| 2017/0314179 A1 | 11/2017 | Arai et al. | |
| 2018/0135190 A1 | 5/2018 | Gohda | |
| 2019/0276940 A1 | 9/2019 | Veening et al. | |

FOREIGN PATENT DOCUMENTS

| | | |
|---|---|---|
| EP | 2191721 | 6/2010 |
| JP | H09122653 | 5/1997 |
| WO | WO01/42143 | 6/2001 |
| WO | WO 2014/064571 | 5/2014 |
| WO | WO 2017/200772 | 11/2017 |

OTHER PUBLICATIONS

International Search Report and Written Opinion for PCT/US2017/031264, dated Jul. 24, 2017, 12 pages.
International Search Report and Written Opinion for PCT/US2018/015144, dated May 4, 2018, 15 pages.

* cited by examiner

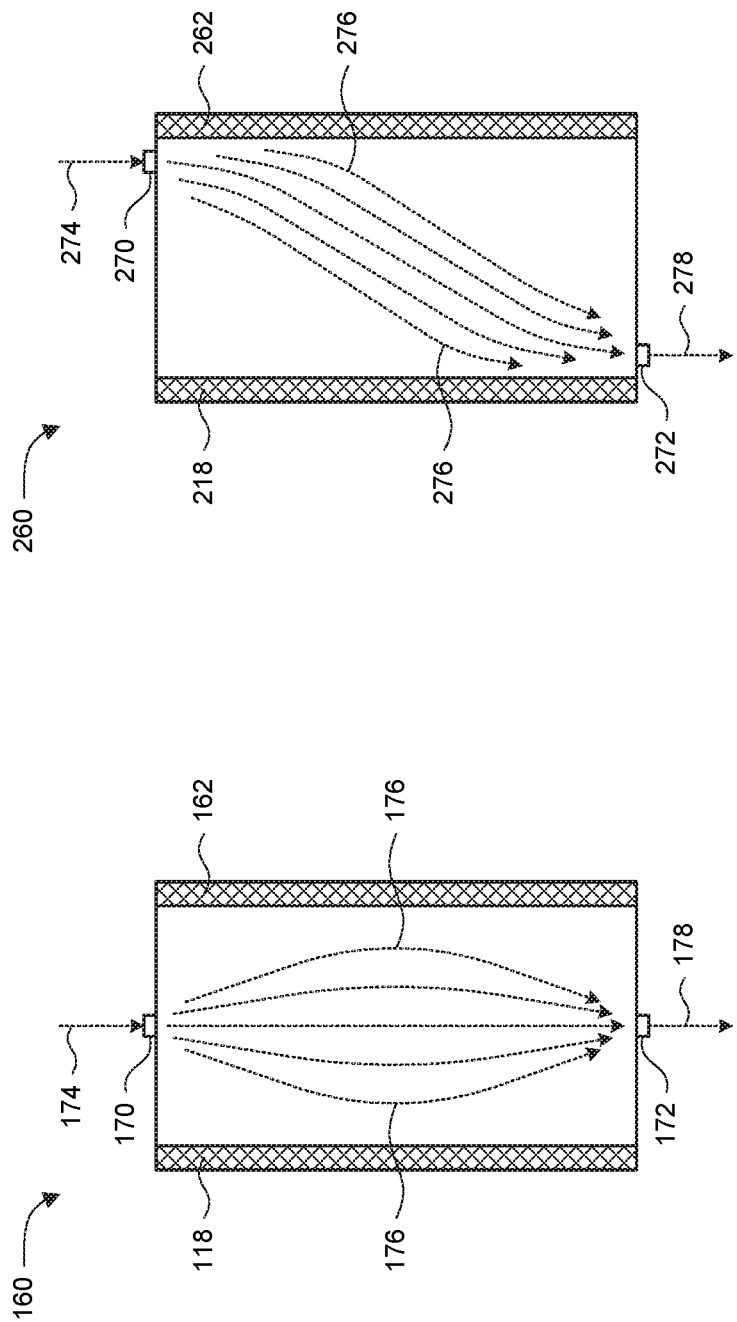

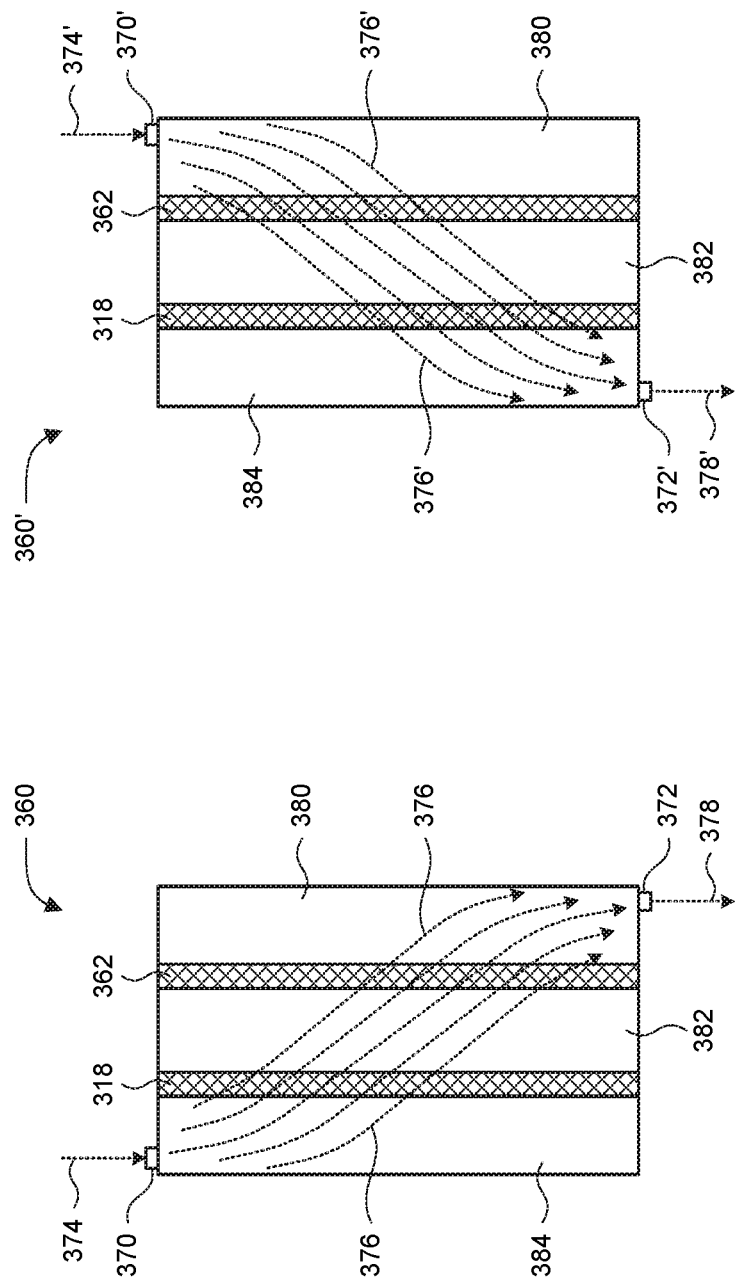

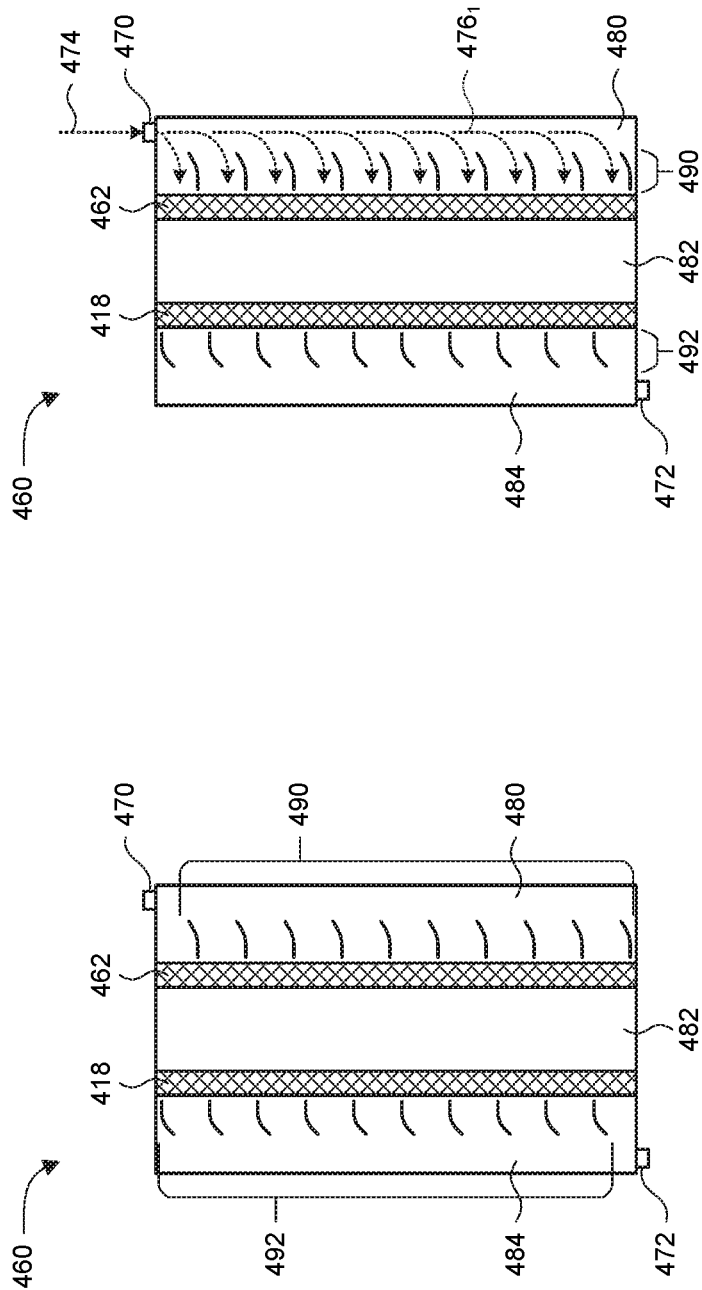

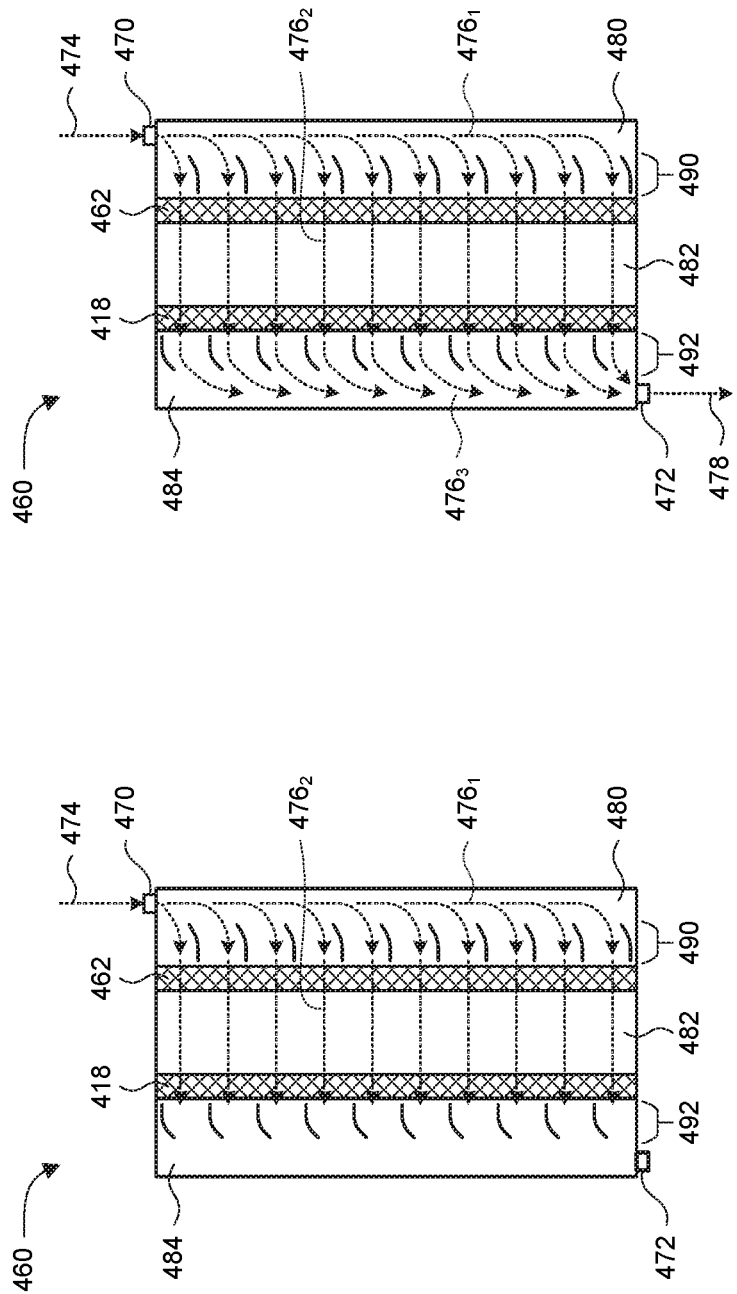

NEUTRALIZATION IN ELECTRO-CHEMICAL ACTIVATION SYSTEMS

CROSS-REFERENCE TO RELATED APPLICATIONS

This application is a National Stage of International Application No. PCT/US2018/015144, filed Jan. 25, 2018, which claims the benefit of U.S. Patent Application No. 62/450,677, filed Jan. 26, 2017, the contents of which are herein incorporated by reference.

BACKGROUND

Chlorine and alkaline solutions are used as cleaning solutions, particularly by washing machines (e.g., commercial washing machines). Stocking chlorine and alkaline solutions for use by washing machine is possible. However, shipping chlorine and alkaline solutions and maintaining an inventory of chlorine and alkaline solutions can be expensive and use valuable resources (e.g., inventory space). It would be advantageous to make and use chlorine and alkaline solutions on-site and on-demand to address the issues with stocking chlorine and alkaline solutions. Making and using chlorine and alkaline solutions on-site presents a number of difficulties, including the reduction of pH level of chlorine solution during electro-chemical activation. These difficulties must be addressed to provide effective on-site generation of chlorine and alkaline concentrated solutions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a neutralization cell is provided for increasing a pH level of a chlorine solution. In an embodiment, the neutralization cell comprises a neutralization anode; a neutralization cathode, wherein the neutralization anode and the neutralization cathode are positioned to divide the neutralization cell into a middle area between the neutralization anode and the neutralization cathode, an anode area on a side of the neutralization anode furthest from the neutralization cathode, and a cathode area on a side of the neutralization cathode furthest from the neutralization anode; an inlet configured to direct the chlorine solution into the neutralization cell by directing an incoming flow of the chlorine solution into the anode area; and an outlet configured to direct the chlorine solution out of the neutralization cell by directing an outgoing flow of the chlorine solution from the anode area.

In another aspect, an electrochemical activation system comprising the neutralization cell described above is provided. The system is configured to generate the incoming flow of the chlorine solution in a chamber cell via electrolysis.

In another aspect, a method of increasing a pH level of a chlorine solution is provided. In an embodiment, the method comprises causing a flow of a chlorine solution to pass through a neutralization cell comprising a neutralization anode and a neutralization cathode, wherein the flow of the chlorine solution enters the neutralization cell in an anode area on a side of the neutralization anode furthest from the neutralization cathode, passes through the neutralization anode, passes through a middle area between the neutralization anode and the neutralization cathode, passes through the neutralization cathode, and exits the neutralization cell from a cathode area on a side of the neutralization cathode furthest from the neutralization anode; and powering the neutralization anode and the neutralization cathode while causing the flow of the chlorine solution.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIG. 2 depicts an example of chlorine solution flow through the neutralization cell in the ECA system shown in FIG. 1, in accordance with the embodiments disclosed herein;

FIG. 3 depicts an embodiment of a neutralization cell that is a variation of the neutralization cell depicted in FIG. 2, in accordance with the embodiments disclosed herein;

FIGS. 4 and 5 depict two embodiments of neutralization cells with electrodes that are positioned away from the walls of the neutralization cells, in accordance with the embodiments disclosed herein;

FIG. 8 depicts an embodiment of a neutralization cell configured to direct flow over lengths of the electrodes, in accordance with the embodiments disclosed herein;

FIGS. 9A to 9C depict an embodiment of a flow of a chlorine solution through the neutralization cell shown in FIG. 8, in accordance with the embodiments disclosed herein;

DETAILED DESCRIPTION

The present disclosure describes embodiments of neutralization cells for use in electro-chemical activation (ECA) systems. More specifically, the present disclosure describes embodiments of directing flow of a chlorine solution through a neutralization cell to improve effectiveness of neutralization.

Figure 1:
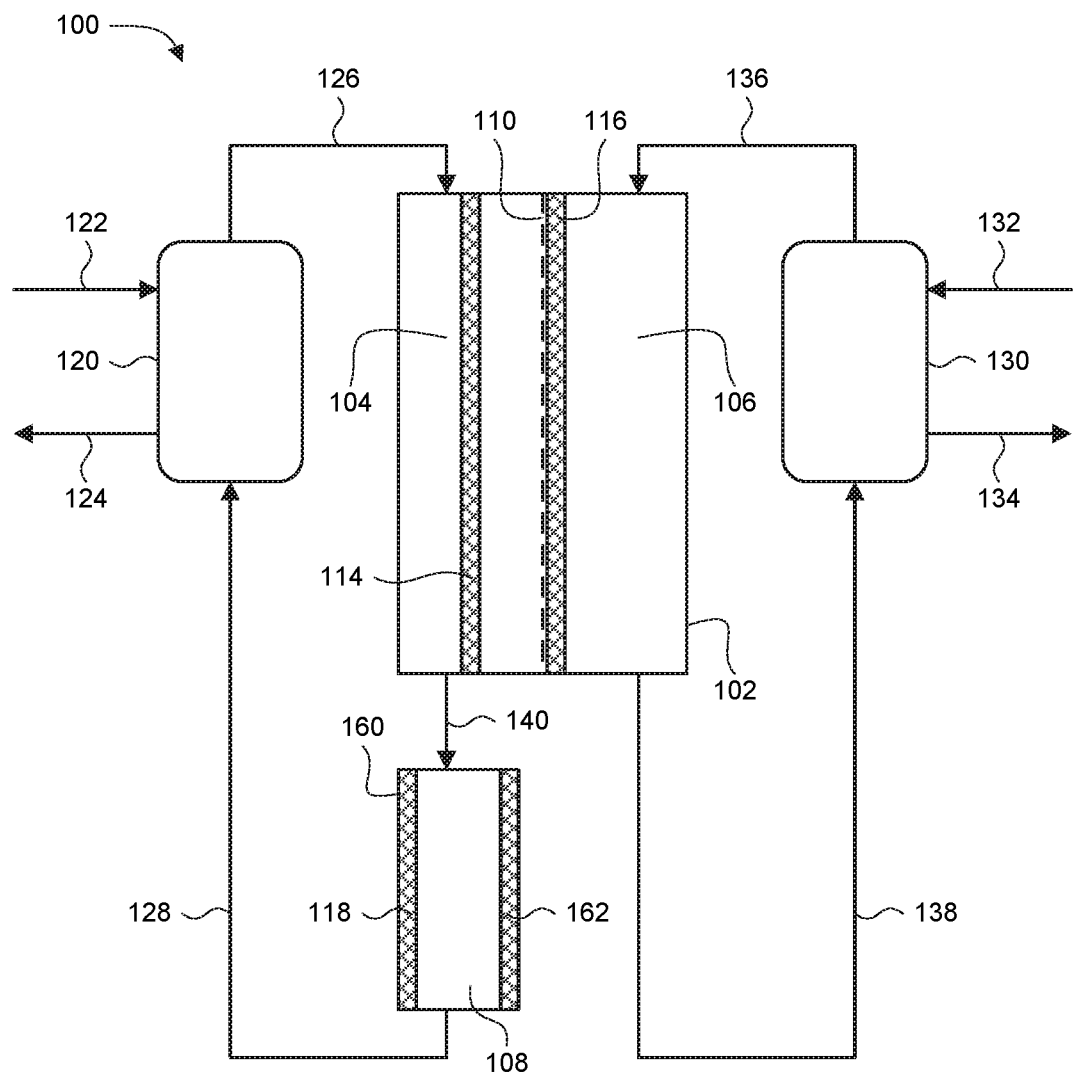
FIG. 1 depicts an embodiment of an ECA system configured to produce highly-concentrated alkaline solutions and highly-concentrated chlorine solutions with a pH above a particular level, in accordance with the embodiments disclosed herein.

Depicted in FIG. 1 is an embodiment of an ECA system 100 configured to produce highly-concentrated alkaline solutions and highly-concentrated chlorine solutions with a pH above a particular level (e.g., above pH 4). The ECA system 100 includes a chamber cell 102 that includes an anode chamber 104 and a cathode chamber 106. The anode chamber 104 is separated from the cathode chamber 106 by a membrane 110. In some embodiments, the membrane 110 is a cation exchange membrane or a bipolar membrane. In some embodiments, the membrane 110 is configured to hinder the migration of Cl⁻, while permitting electrolysis to be performed by an anode and a cathode on either side of the membrane.

The ECA system 100 also includes a neutralization cell 160 that includes a neutralization chamber 108. In the depicted embodiment, the anode chamber 104 and the neutralization chamber 108 are physically separated from each other because they are located respectively, in the chamber cell 102 and the neutralization cell 160. In other embodiments, the neutralization chamber 108 can be located in the chamber cell 102 and be separated from the anode chamber 104 by another membrane. Examples of this arrangement are depicted in the figures of PCT Patent Publication WO2017200772, the contents of which are hereby incorporated by reference in their entirety.

The anode chamber 104 includes an anode 114. In some embodiments, the anode 114 is a solid, porous, or meshed electrode. In some embodiments, the anode 114 is made from titanium with a titanium oxide coating or an iridium (oxide) coating or a dimensionally stable anodes-Cl (DSA-Cl) type coating. In some embodiments, the anode 114 is made from graphite.

The cathode chamber 106 includes a cathode 116. In some embodiments, the cathode 116 is a porous or meshed electrode. In some embodiments, the cathode 116 is made from titanium. In some embodiments, the cathode 116 is made from graphite. In some embodiments, such as shown in FIG. 1, the cathode 116 is placed in the cathode chamber 106 near or in direct contact with the membrane 110.

The neutralization chamber 108 includes a neutralization cathode 118 and a neutralization anode 162. In some embodiments, the neutralization cathode 118 is a solid, porous or meshed electrode. In some embodiments, the neutralization cathode 118 and/or the neutralization anode 162 is made from titanium with a titanium oxide coating or an iridium (oxide) coating or a DSA-Cl type of coating. In some embodiments, the neutralization cathode 118 and/or the neutralization anode 162 is made from graphite. In some embodiments, such as shown in FIG. 1, the neutralization cathode 118 and the neutralization anode 162 are placed in the neutralization chamber 108 near or at opposite sides of the neutralization chamber 108. In some embodiments, the neutralization cathode 118 and the neutralization anode 162 are located in the neutralization chamber 108 such that the ratio of exposed anode surface area in the neutralization chamber 108 to the exposed cathode surface area in the neutralization chamber 108 is in a range from about 1:1 to about 1:10,000.

The ECA system 100 also includes a chlorine solution tank 120. A brine supply line 122 is configured to carry brine from an external source (e.g., a brine tank) into the chlorine solution tank 120. A chlorine solution supply line 124 is configured to carry chlorine solution out of the chlorine solution tank 120 to an external destination (e.g., a washing machine). An anode chamber supply line 126 is configured to carry fluid out of the chlorine solution tank 120 to the anode chamber 104. In some embodiments, the fluid carried by anode chamber supply line 126 is brine, anodic electrolyte, water, any other fluid, or any combination thereof.

A neutralization supply line 140 is configured to carry anodic electrolyte out of the anode chamber 104 to the neutralization chamber 108. An anode return line 128 is configured to carry anodic electrolyte out of the neutralization chamber 108 back to the chlorine solution tank 120. In some embodiments, such as the embodiment shown in FIG. 1, the anode return line 128 is configured to carry anodic electrolyte out of the neutralization chamber 108 from a side of the neutralization chamber 108 that is opposite of the side of the neutralization chamber 108 into which the neutralization supply line 140 carries anodic electrolyte into the neutralization chamber 108.

The ECA system 100 also includes an alkaline solution tank 130. A water supply line 132 is configured to carry raw or softened water from an external source (e.g., a water tank) into the alkaline solution tank 130. An alkaline solution supply line 134 is configured to carry alkaline solution out of the alkaline solution tank 130 to an external destination (e.g., a washing machine/tap). A cathode chamber supply line 136 is configured to carry fluid out of the alkaline solution tank 130 to the cathode chamber 106. In some embodiments, the fluid carried by the cathode chamber supply line 136 is cathodic electrolyte, water, any other fluid, or any combination thereof. A cathode return line 138 is configured to carry cathodic electrolyte out of the cathode chamber 106 back to the alkaline solution tank 130. In some embodiments, such as the embodiment shown in FIG. 1, the cathode return line 138 is configured to carry cathodic electrolyte out of the cathode chamber 106 from a side of the cathode chamber 106 that is opposite of the side of the cathode chamber 106 into which the cathode chamber supply line 136 carries fluid into the cathode chamber 106.

The ECA system 100 can be used to create concentrated cleaning solutions, such as to produce concentrated chlorine solution and concentrated alkaline solution for commercial dishwashing machines or other cleaning scenarios. In some embodiments of using the ECA system 100, brine is added to the chlorine solution tank 120. A brine flow passes through the brine supply line 122 into the chlorine solution tank 120. Adding brine to the chlorine solution tank 120 is sometimes referred to as "charging" the chlorine solution tank 120. In some embodiments, the brine is raw water (i.e., untreated water) or soft water (i.e., water with a low ion concentration) that has an alkali metal chloride. In some examples, the alkali metal chloride has a concentration in a range from about 0.25% to about 40% by weight. Water is also added to the alkaline solution tank. A water flow passes through the water supply line 132. Adding water to the alkaline solution tank 130 is sometimes referred to as "charging" the alkaline solution tank 130. In some embodiments, the water is raw water (i.e., untreated water) or soft water (i.e., water with low ion concentration) that is free from alkali metal chloride and water hardness salts.

The brine solution is circulated to create a concentrated chlorine solution. The circulation includes a flow of fluid from the chlorine solution tank 120 to the anode chamber 104 via the anode chamber supply line 126, a flow of anodic electrolyte from the anode chamber 104 to the neutralization chamber 108 via the neutralization supply line 140, and a flow of anodic electrolyte from the neutralization chamber 108 back to the chlorine solution tank 120 via the anode return line 128.

An electrolysis process occurs by applying a voltage between the anode 114 and the cathode 116. As previously noted, in some embodiments, the brine has an alkali metal chloride with a concentration in a range from about 0.25% to about 40% by weight. As the brine passes through the anode chamber 104, the active (i.e., powered) anode 114 causes some of the water with alkali metal chloride to be converted to hypochlorous acid according to the following anode half-cell reaction:

$$Cl^- + H_2O \rightarrow OCl^- + 2H^+ + 2e^- \; (Eo \; 1.45V) \tag{1}$$

Because not all of the water and alkali metal chloride is converted to hypochlorous acid, the result of passing brine through the anode chamber is an anodic electrolyte containing water, alkali metal chloride, and hypochlorous acid.

The concentration of the hypochlorous acid in the anodic electrolyte after one pass through the anode chamber 104 may not be as high as desired for particular cleaning solutions. In some examples, commercial washing machines may use highly-concentrated cleaning solutions, particularly when commercial washing machines add fresh water to dilute the cleaning solution as part of the washing process. In some embodiments, in order to raise the concentration of the hypochlorous acid in the anodic electrolyte, the anodic electrolyte is circulated through the anode chamber 104 multiple times to create more hypochlorous acid in the anodic electrolyte until a concentrated chlorine solution is formed.

In some embodiments, the recirculation continues until the concentrated chlorine solution reaches a predetermined active chlorine concentration. In some examples, the predetermined active chlorine ($OCl^-$) concentration is in a range from about 0.02% to about 14% (i.e., from about 200 ppm to about 140,000 ppm) In some embodiments, the concentration of active chlorine used in (ware) washing machines is in the range of about 15 ppm to about 60 ppm, and the (ware) washing machines are configured to receive concentrated chlorine solution in a range from about 0.02% to about 14% (i.e., from about 200 ppm to about 140,000 ppm) and to dilute the concentrated chlorine solution to the use range from about 15 ppm to about 60 ppm. In other embodiments, the recirculation continues until the concentrated chlorine solution has been circulated a predetermined number of times. In some examples, the predetermined number of times is in a range from about two times to about 10,000 times. In this way, the ECA system 100 creates a concentrated chlorine solution by circulating the anodic electrolyte until the concentration of the chlorine solution reaches a particular concentration. In some embodiments, the predetermined active chlorine concentration is in a range from about 0.02% to about 14% (i.e., from about 200 ppm to about 140,000 ppm), in a range from about 0.02% to about 10% (i.e., from about 200 ppm to about 100,000 ppm), or in a range from about 0.02% to about 5% (i.e., from about 200 ppm to about 50,000 ppm).

One possible issue with recirculating anodic electrolyte to create concentrated chlorine solution is that the reaction in the anode chamber 104 forms protons. The protons increase acidity of the anodic electrolyte, resulting in a resulting drop in pH of the anodic electrolyte. Chlorine gas ($Cl_2$) may form at low pH values, typically in a range below about pH 4. The formation of chlorine gas creates a safety issue as chlorine gas is harmful to users of (ware) washing machines and cleaning personnel. Thus, in order to avoid the creation of chlorine gas, the pH level of the anodic electrolyte should be kept above about pH 4.

In order to avoid a pH drop below pH 4, the circulating anodic electrolyte is passed through the neutralization chamber 108 after it leaves the anode chamber 104. The neutralization chamber 108 includes the neutralization cathode 118 and the neutralization anode 162 that, when operating in connection with each other, remove protons from the anodic electrolyte. The neutralization effect occurs as a result of the half reaction according to the following chemical reaction:

$$2H^+ + 2e^- \rightarrow H_2 \; (Eo \; (V) + 0.00) \tag{2}$$

In some embodiments, the neutralization chamber 108 is operated such that the anodic electrolyte remains pH-neutral (i.e., having a pH level in a range from about pH 6 to about pH 8). In some embodiments, the neutralization chamber 108 is operated such that the anodic electrolyte remains at a pH level in a range from about pH 4 to about pH 7.

The water is circulated to create a concentrated alkaline solution. The circulation includes a flow of fluid from the alkaline solution tank 130 to the cathode chamber 106 via the cathode chamber supply line 136 and a flow of cathodic electrolyte from the cathode chamber 106 back to the alkaline solution tank 130 via the cathode return line 138. As the water passes through the cathode chamber 106 during the electrolysis process, the active (i.e., powered) cathode 116 causes some of the water to be converted to an alkaline electrolyte according to the following cathode half-cell reaction:

$$2H_2O + 2e^- \rightarrow H_2(g) + 2OH^- \; (Eo \; -0.83V) \tag{3}$$

The concentration of the alkaline electrolyte after one pass through the cathode chamber 106 may not be as high as desired for particular cleaning machines. In some examples, commercial washing machines may use highly-concentrated cleaning solutions. In some embodiments, in order to raise the concentration of the alkaline electrolyte, the alkaline electrolyte is circulated through the cathode chamber 106 multiple times to create a concentrated alkaline solution. In some embodiments, the recirculation continues until the concentrated alkaline solution reaches a predetermined alkalinity. In some examples, the predetermined alkalinity is in a range from about 0.02% $Na_2O$ to about 50% $Na_2O$ (i.e., from about 200 ppm $Na_2O$ to about 500,000 ppm $Na_2O$). In some embodiments, (ware) washing machines wash with alkalinity levels in the range from about 50 ppm $Na_2O$ to about 400 ppm $Na_2O$, and the (ware) washing machines are configured to receive concentrated alkaline solution in a range from about 0.02% $Na_2O$ to about 50% $Na_2O$ (i.e., from about 200 ppm $Na_2O$ to about 500,000 ppm $Na_2O$) and to dilute the concentrated chlorine solution to the use range from about 50 ppm $Na_2O$ to about 400 ppm $Na_2O$. In other embodiments, the recirculation continues until the concentrated alkaline solution has been circulated a predetermined number of times. In some examples, the predetermined number of times is in a range from about two times to about 10,000 times. In this way, the ECA system 100 creates a concentrated alkaline solution by circulating the alkaline electrolyte until the alkalinity of the alkaline solution reaches a particular concentration. In some examples, the predetermined alkalinity is in a range from about 0.02% $Na_2O$ to about 50% $Na_2O$ (i.e., from about 200 ppm $Na_2O$ to about 500,000 ppm $Na_2O$), in a range from about 0.02% $Na_2O$ to about 10% $Na_2O$ (i.e., from about 200 ppm $Na_2O$ to about 100,000 ppm $Na_2O$), or in a range from about 0.02% $Na_2O$ to about 5% $Na_2O$ (i.e., from about 200 ppm $Na_2O$ to about 50,000 ppm $Na_2O$).

The circulation of the anodic electrolyte and the cathodic electrolyte may be performed at least partially simultaneously. This allows both the concentrated chlorine solution and the concentrated alkaline solution to be created at least partially simultaneously. In some embodiments, while both the anode 114 and the cathode 116 are operating and both the and the neutralization anode 162 and the neutralization cathode 118 are operating simultaneously, the reaction caused by the neutralization cathode 118 may not remove enough protons from the anodic electrolyte to maintain the pH level in a safe range (e.g., above about pH 4). In some embodiments, the pH level of the anodic electrolyte is monitored. As the pH level drops to a predetermined level (e.g., below pH 5), the operation of the anode 114 and the cathode 116 is reduced or discontinued so that operation of the neutralization anode 162 and the neutralization cathode 118 is resumed or is increased to raise the pH level of the anodic electrolyte. As the pH level returns to a safe level (e.g., to a point in a range from about pH 6 to about pH 8), the operation of the anode 114 and the cathode 116 is increased or resumed to continue increasing the alkalinity of the alkaline solution.

Variations of arrangement of the ECA system 100 are possible while preserving the functions described herein. Some embodiments of variations of the ECA system are depicted and described in PCT Patent Publication WO2017200772, the contents of which are hereby incorporated by reference in their entirety. Described below herein are embodiments of neutralization cells configured to achieve a chlorine solution flow which improves the effectiveness of the neutralization. The embodiments of neutralization cells described herein may be used in the ECA system 100 in place of the neutralization cell 160 or in any variation of the ECA system 100.

Depicted in FIG. 2 is an example of chlorine solution flow through the neutralization cell 160. The neutralization cell 160 includes an inlet 170 and an outlet 172. In some embodiments, the inlet 170 is coupled to the neutralization supply line 140 and the outlet 172 is coupled to the anode return line 128. In other embodiments, the outlet 172 is coupled directly to the point of chlorine solution use and/or application. An incoming flow 174 of chlorine solution enters the neutralization cell 160 through the inlet 170. The chlorine solution passes in an internal flow 176 inside of the neutralization cell 160. An outgoing flow 178 of chlorine solution exits the neutralization cell 160 through the outlet 172.

Inside the neutralization cell 160, a number of reactions take place. Those reactions include:

$$2H_2O+2e^- \rightarrow H_2+2OH^- \qquad (4)$$

$$2Cl^- \rightarrow Cl_2+2e^- \qquad (5)$$

$$Cl_2+2OH^- \rightarrow ClO^-+Cl^-+H_2O \qquad (6)$$

$$H^++OH^- \rightarrow H_2O \qquad (7)$$

Equation (4) occurs in the chlorine solution near the surface of the neutralization cathode 118 and equation (5) occurs in the chlorine solution near the surface of the neutralization anode 162. Equations (6) and (7) are follow-up reactions that occur following the reactions in equations (4) and (5). The protons ($H^+$) in equation (7) were generated during production in the anode chamber 104. The removal of these protons from the chlorine solution increases the pH level of the chlorine solution. An alternative reaction for $Cl^-$ in the presence of water is as follows:

$$Cl_2+2H_2O \rightarrow HClO^-+H^++Cl^- \qquad (8)$$

Because equation (8) produces protons, it is preferable for equation (6) to occur instead of equation (8). In some cases, the equation (6) occurs more easily than equation (8), and therefore the $Cl_2$ in the chlorine solution will more readily react with the $OH^-$ in the chlorine solution despite the present or readily-available water in the chlorine solution. However, it would be preferable to encourage the occurrence of equation (6) and discourage the occurrence of equation (8) wherever possible.

In the embodiment depicted in FIG. 2, the neutralization anode 162 and the neutralization cathode 118 are arranged at opposite sides of the neutralization cell 160 and are arranged substantially parallel to the incoming flow 174 and the outgoing flow 178 of the chlorine solution. The internal flow 176 allows some of the chlorine solution to pass by one of the neutralization anode 162 or the neutralization cathode 118. However, the most direct path of the internal flow 176 takes the chlorine solution down the middle of the neutralization cell 160, away from both the neutralization anode 162 and the neutralization cathode 118. In practice, the internal flow 176 takes some of the chlorine solution closer to the neutralization anode 162 and some of the chlorine solution closer to the neutralization cathode 118. However, the reactions near the surfaces of the neutralization anode 162 and the neutralization cathode 118 (e.g., equations (4) and (5)) do not occur efficiently and the follow-up equations that provide the neutralization effect (e.g., equations (6) and (7)) do not occur as much as desired.

Depicted in FIG. 3 is an embodiment of a neutralization cell 260 that is a variation of the neutralization cell 160 depicted in FIG. 2. The neutralization cell 260 includes a neutralization anode 262 and a neutralization cathode 218. The neutralization cell 260 also includes an inlet 270 and an outlet 272. An incoming flow 274 of chlorine solution enters the neutralization cell 260 through the inlet 270. The chlorine solution passes in an internal flow 276 inside of the neutralization cell 260. An outgoing flow 278 of chlorine solution exits the neutralization cell 260 through the outlet 272.

In contrast to the neutralization cell 160, the inlet 270 of the neutralization cell 260 is located near the neutralization anode 262 and the outlet 272 of the neutralization cell 260 is located near the neutralization cathode 218. This arrangement of the inlet 270 and the outlet 272 causes the internal flow 276 to pass by both a portion of the neutralization anode 262 and a portion of the neutralization cathode 218. Because internal flow 276 causes the chlorine solution to pass more closely to the neutralization anode 262 and the neutralization cathode 218, the occurrence of equations (4) and (5) in the chlorine solution is more frequent. Therefore, the follow-up equations (6) and (7) that provide the neutralization effect also occur more frequently.

Depicted in FIGS. 4 and 5 are two embodiments of neutralization cells 360 and 360' with electrodes that are positioned away from the walls of the neutralization cells 360 and 360'. Each of the neutralization cells 360 and 360' includes a neutralization anode 362 and a neutralization cathode 318. The neutralization anode 362 and the neutralization cathode 318 are positioned away from the walls of the neutralization cells 360 and 360'. The neutralization anode 362 and the neutralization cathode 318 are positioned to divide each of the neutralization cells 360 and 360' into an anode area 380 on a side of the neutralization anode 362 furthest from the neutralization cathode 318, a middle area 382 between the neutralization anode 362 and the neutralization cathode 318, and a cathode area 384 on a side of the neutralization cathode 318 furthest from the neutralization anode 362.

One benefit to the positioning of the neutralization anode 362 and the neutralization cathode 318 in FIGS. 4 and 5 is an increase in the occurrence of the reactions shown in equations (4) and (5). With the neutralization anode 362 and the neutralization cathode 318 away from the walls of the neutralization cells 360 and 360', a greater amount of surface area of the neutralization anode 362 and the neutralization cathode 318 are exposed to the chlorine solution. Because the reactions shown in equations (4) and (5) occur near the surfaces of the neutralization anode 362 and the neutralization cathode 318, the increase in the exposed surface area of the neutralization anode 362 and the neutralization cathode 318 results in the increase in the occurrence of the equations (4) and (5). Another benefit to this arrangement is the effective degassing of the neutralization cells 360 and 360'. Fluid entry is typically at the bottom side because it removes gasses well from the cell. This effectively degasses the cell at startup and during the operation of the neutralization cell when hydrogen is formed at the cathode, which is then also effectively removed from the neutralization cells 360 and 360'.

The neutralization cell 360 includes an inlet 370 and an outlet 372. The inlet 370 is configured to direct an incoming flow 374 of the chlorine solution into the cathode area 384 of the neutralization cell 360. The outlet 372 is configured to direct an outgoing flow 378 of the chlorine solution from the anode area 380 of the neutralization cell 360. An internal flow 376 of the chlorine solution passes from the cathode area 384 into the middle area 382 through the neutralization cathode 318. The internal flow 376 of the chlorine solution also passes from the middle area 382 into the anode area 380 through the neutralization anode 362.

The neutralization cell 360' includes an inlet 370' and an outlet 372'. The inlet 370' is configured to direct an incoming flow 374' of the chlorine solution into the anode area 380 of the neutralization cell 360. The outlet 372' is configured to direct an outgoing flow 378 of the chlorine solution from the cathode area 384 of the neutralization cell 360'. An internal flow 376' of the chlorine solution passes from the anode area 380 into the middle area 382 through the neutralization anode 362. The internal flow 376' of the chlorine solution also passes from the middle area 382 into the cathode area 384 through the neutralization cathode 318.

Figure 6A:
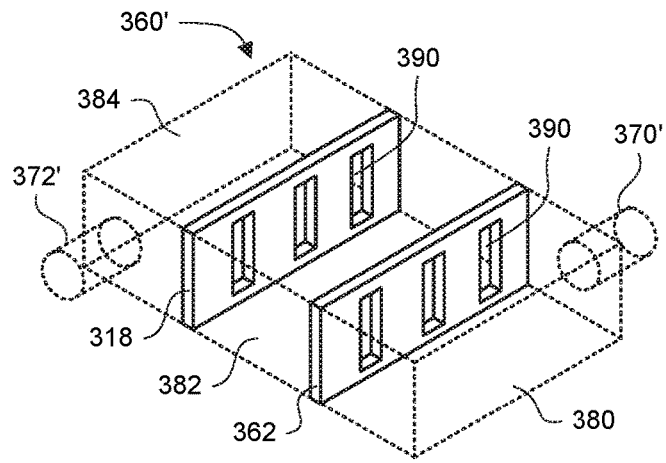
FIGS. 6A to 6C depict embodiments of the neutralization cell depicted in FIG. 5 with the neutralization anode and the neutralization cathode being different types of non-solid electrodes, in accordance with the embodiments disclosed herein.
Figure 6B:
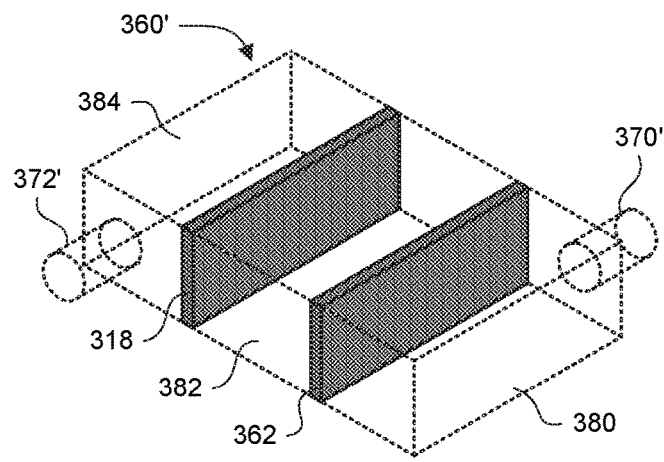
Figure 6C:
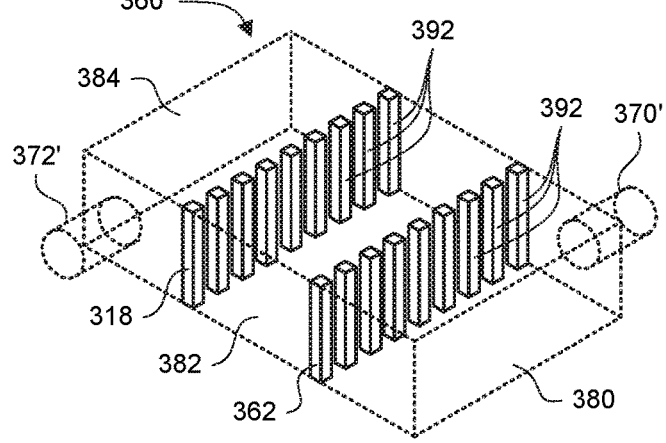
Figure 7A:
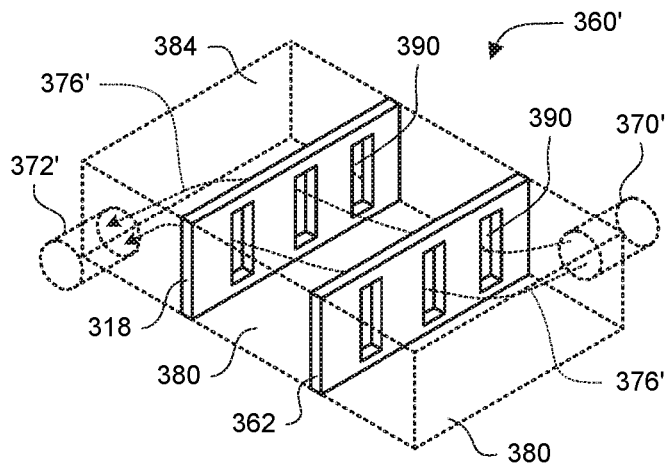
FIGS. 7A to 7C depict examples of internal flow through the embodiments of the neutralization cell depicted, respectively, in FIGS. 6A to 6C, in accordance with the embodiments disclosed herein.
Figure 7B:
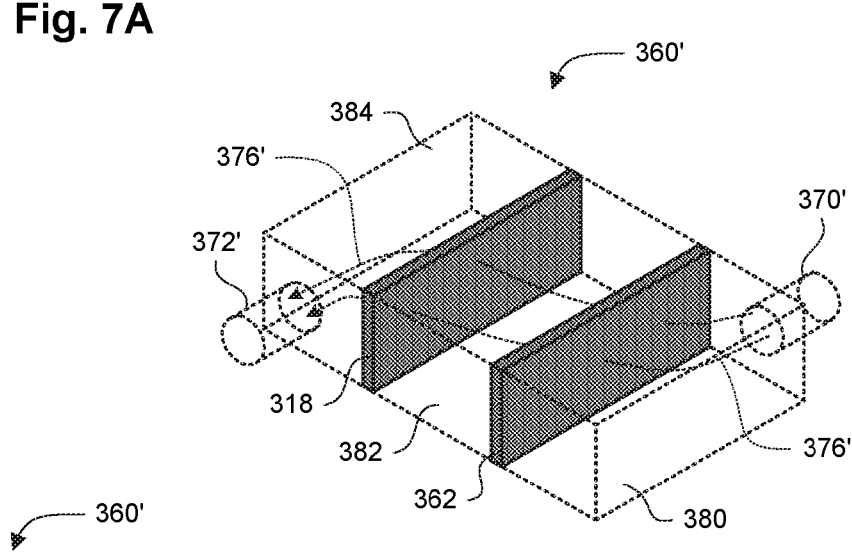
Figure 7C:
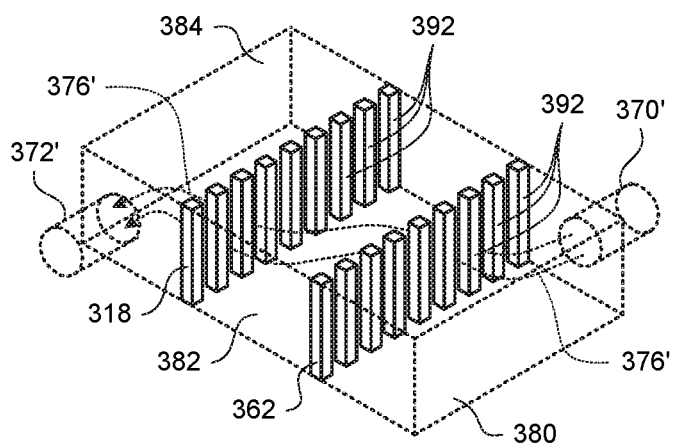

In the depicted embodiment, the neutralization anode 362 and the neutralization cathode 318 are non-solid to permit the internal flows 376 and 376' to pass through the neutralization anode 362 and the neutralization cathode 318. In some embodiments, each of the neutralization anode 362 and the neutralization cathode 318 is a slotted electrode, a porous electrode, a divided electrode, a mesh electrode, or any other type of non-solid electrode. Depicted in FIGS. 6A to 6C are embodiments of the neutralization cell 360' with the neutralization anode 362 and the neutralization cathode 318 being different types of non-solid electrodes. Depicted in FIGS. 7A to 7C are examples of internal flow through the embodiments of the neutralization cell 360' depicted, respectively, in FIGS. 6A to 6C. In FIG. 6A, the neutralization anode 362 and the neutralization cathode 318 are slotted electrodes with slots 390 through which the chlorine solution can pass. As shown in FIG. 7A, the internal flow 376' of the chlorine solution passes through the slots 390 on its way from the inlet 370' to the outlet 372'. In FIG. 6B, the neutralization anode 362 and the neutralization cathode 318 are porous electrodes with small holes through which the chlorine solution can pass. As shown in FIG. 7B, the internal flow 376' of the chlorine solution passes through the porous holes on its way from the inlet 370' to the outlet 372'. In FIG. 6C, the neutralization anode 362 and the neutralization cathode 318 are divided electrodes with separate electrode portions 392 between which the chlorine solution can pass. As shown in FIG. 7C, the internal flow 376' of the chlorine solution passes between the electrode portions 392 on its way from the inlet 370' to the outlet 372'.

Referring back to FIGS. 4 and 5, experiments were conducted using an ECA system similar to the ECA system 100 shown in FIG. 1, but with the neutralization cells 360 and 360' used for the neutralization. First, a chlorine solution was created by the ECA system by treating a brine solution of about 1500 ppm with a pH level of about pH 7. The chlorine solution produced by the ECA system had 125 ppm of chlorine and a pH level of pH 2.7.

Second, the neutralization cell 360 was used to treat the chlorine solution. The chlorine solution was passed into the cathode area 384, through the neutralization cathode 318, through the middle area 382, through the neutralization anode 362, and out of the anode area 380. The pH level of the chlorine solution was monitored as it was passing out of the anode area 380, and the pH level of the chlorine solution dropped below pH 1. It appears that passing the chlorine solution by the neutralization cathode 318 first and then by the neutralization anode 362 caused the reaction in equation (8) to occur instead of the reaction in equation (6). This increased the number of protons in the chlorine solution rather than removed them, and therefore dropped the pH level of the chlorine solution.

Third, the neutralization cell 360' was used to treat the chlorine solution. The chlorine solution was passed into the anode area 380, through the neutralization anode 362, through the middle area 382, through the neutralization cathode 318, and out of the cathode area 384. The pH level of the chlorine solution was monitored as it was passing out of the cathode area 384, and the pH level of the chlorine solution rose to a pH level of pH 5.6. Interestingly, the concentration of chlorine also increased to a level of 260 ppm of chlorine. Thus, as the neutralization cell 360' had a neutralizing effect on the chlorine solution, it also increased the concentration of the chlorine solution.

Based on the experiments, it appears that a neutralization cell is more effective when chlorine solution enters the neutralization cell on a side of the anode furthest from the cathode, passes through the anode and then through the cathode, and then exits the neutralization cell on a side of the cathode further from the anode. This system and method is effective at providing a neutralizing effect on the chlorine solution. It also tends to increase the concentration of the chlorine solution while also providing the neutralizing effect. In some embodiments, the distance between the anode and the cathode is selected to increase the effectiveness of the neutralization. In one example, the distance between the anode and the cathode is in a range from about 0.01 mm to about 10 mm. In another example, the distance between the anode and the cathode is in a range from about 0.01 mm to about 3 mm.

In some embodiments, the neutralization effect produced by a neutralization cell can be increased by directing the internal flow across a wider surface area of the anode and in other embodiments, of the cathode. As will be further described below with reference to the embodiments of FIGS. 8, 9A-9C, 10D, 11 and 12, directing an internal flow in this way can mean altering an incoming flow (e.g., its direction, its flow rate) so as to distribute the incoming flow, including uniformly distributing it, across a length of an electrode. Although embodiments of neutralization cells can provide highly uniform distributions of an incoming flow across of length of an electrode, even without achieving complete uniformity, an increase in uniformity can achieve an increase in pH of a chlorine solution and thus, an increase in the effectiveness of the neutralization.

Depicted in FIG. 8 is an embodiment of a neutralization cell 460 configured to direct flow across lengths of both of the electrodes. The neutralization cell 460 includes a neutralization anode 462 and a neutralization cathode 418. The neutralization anode 462 and the neutralization cathode 418 are positioned to divide the neutralization cell 460 into three areas: an anode area 480 on a side of the neutralization anode 462 that is furthest from the neutralization cathode 418, a middle area 482 that is between the neutralization anode 462 and the neutralization cathode 418, and a cathode area 484 on a side of the neutralization cathode 418 that is furthest from the neutralization anode 462. The neutralization cell 460 also includes an inlet 470 and an outlet 472. The inlet 470 is configured to permit a chlorine solution to enter the neutralization cell 460 into the anode area 480 and the outlet 472 is configured to permit the chlorine solution to exit the neutralization cell 460 from the cathode area 484.

The neutralization cell 460 also includes an anode guide 490 located in the anode area 480. The anode guide 490 is configured to direct a flow of the chlorine solution from the inlet 470 across a length of the neutralization anode 462. In this embodiment, the anode guide 490 comprises a plurality of separated projections distributed across a length of the neutralization anode 462. Each projection is oriented approximately perpendicular to, and extending away from, the neutralization anode 462. Each projection also has an end furthest away from the neutralization anode 462 which is curved towards the inlet 470. However, as will be described below, other physical structures may be used to direct a flow of the chlorine solution from the inlet 470 across a length of the neutralization anode 462. In some embodiments, the length of the neutralization anode 462 over which anode guide 490 directs the flow is a length in a range from at least half the entire length of the neutralization anode 462 to the entire length of the neutralization anode 462.

As shown in FIG. 8, the neutralization cell 460 also includes a cathode guide 492 located in the cathode area 484. The cathode guide 492 is configured to direct a flow of the chlorine solution from across a length of the neutralization cathode 418 toward the outlet 472. In this embodiment, the configuration of the cathode guide 492 is analogous to that of the anode guide 462 except that the cathode guide 492 is configured to direct the flow of the chlorine solution from across a length of the neutralization cathode 418 toward the outlet 472. Other physical structures may be used to direct a flow of the chlorine solution from across a length of the neutralization cathode 418 toward the outlet 472 as described above with respect to the neutralization anode 462. In some embodiments, the length of the neutralization cathode 418 from which cathode guide 492 directs the flow is a length in a range from at least half the length of the neutralization cathode 418 to the entire length of the neutralization cathode 418.

A flow of a chlorine solution through the neutralization cell 460 of FIG. 8 is depicted in more detail in FIGS. 9A to 9C. FIG. 9A illustrates how directing an incoming flow 474 of a chlorine solution across a length of the neutralization anode 462 can involve diverting the incoming flow 474 (which is substantially parallel to the neutralization anode 462) so that the incoming flow 474 flows through the neutralization anode 462 substantially perpendicularly and is distributed across the length of the neutralization anode 462. Specifically, the incoming flow 474 of chlorine solution enters the neutralization cell 460 through the inlet 470. In the depicted embodiment, the incoming flow 474 enters the neutralization cell 460 substantially parallel to the neutralization anode 462. Once the chlorine solution is in the anode area 480, an internal flow $476_1$ of the chlorine solution passes through the anode area 480. The internal flow $476_1$ is directed from the inlet 470 across a length of the neutralization anode 462 by the anode guide 490. In the depicted embodiment, the anode guide 490 causes the internal flow $476_1$ to turn from being substantially parallel to the neutralization anode 462 to being substantially perpendicular to the neutralization anode 462 across the length of the neutralization anode 462. The depicted embodiment can increase the uniformity of the flow of the chlorine solution through the neutralization anode 462 as compared to the flow without the anode guide 490.

As shown in FIG. 9B, an internal flow $476_2$ of the chlorine solution in the middle area 482 continues from the neutralization anode 462 to the neutralization cathode 418. In some embodiments, the internal flow $476_2$ continues in a direction similar to the direction of the internal flow $476_1$ caused by the anode guide 490. As shown in FIG. 9C, an internal flow $476_3$ of the chlorine solution in the cathode area 484 is directed from across a length of the neutralization cathode 418 toward the outlet 472 by the cathode guide 492. An outgoing flow 478 of the chlorine solution then exits the neutralization cell 460 via the outlet 472.

The flows depicted in FIGS. 9A to 9C increase the effectiveness of the neutralization reactions inside the neutralization cell 460. More specifically, the reaction shown in equation (5) occurs more readily because the internal flow $476_1$ directs the chlorine solution across a length of the neutralization anode 462 so that a greater surface area of the neutralization anode 462 is exposed to the chlorine solution. Also, the reaction shown in equation (4) occurs more readily because the internal flow $476_2$ directs the chlorine solution across a length of the neutralization cathode 418 so that a greater surface area of the neutralization cathode 418 is exposed to the chlorine solution. Because the equations (4) and (5) occur more readily, the follow-up reactions shown in equations (6) and (7) also occur more readily. In this way, a greater number of protons are removed from the chlorine solution via the reaction in equation (7) and the higher the pH level of the chlorine solution is raised and more chlorine is formed in the neutralization cell 460.

Figure 10B:
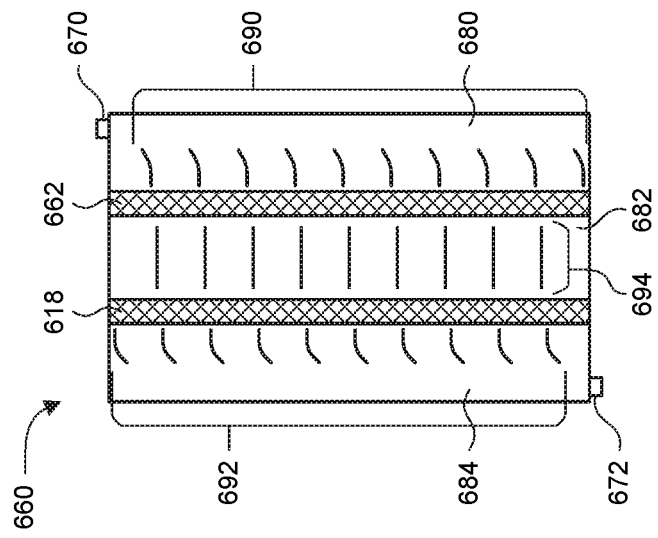
FIGS. 10A to 10D depict various embodiments of neutralization cells with anode guides, in accordance with the embodiments disclosed herein.
Figure 10A:
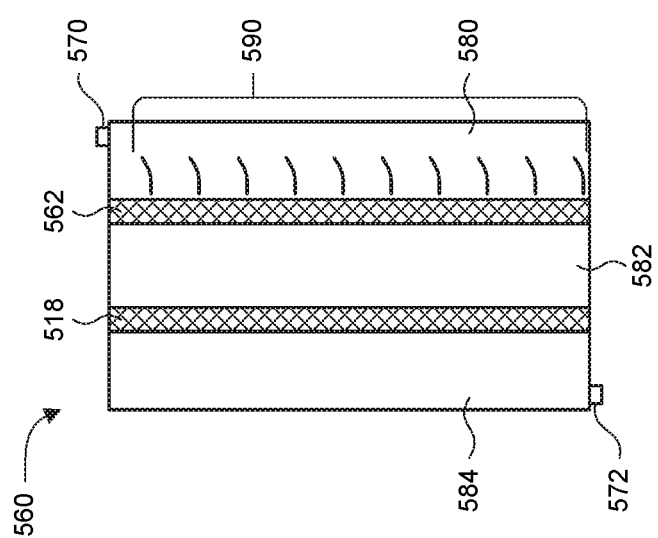

Various embodiments of neutralization cells with anode guides are depicted in FIGS. 10A to 10D. FIG. 10A depicts a neutralization cell 560 that includes a neutralization anode 562 and a neutralization cathode 518. The neutralization anode 562 and the neutralization cathode 518 are positioned to divide the neutralization cell 560 into three areas: an anode area 580 on a side of the neutralization anode 562 that is furthest from the neutralization cathode 518, a middle area 582 that is between the neutralization anode 562 and the neutralization cathode 518, and a cathode area 584 on a side of the neutralization cathode 518 that is furthest from the neutralization anode 562. The neutralization cell 560 also includes an inlet 570 and an outlet 572. The inlet 570 is configured to permit a chlorine solution to enter the neutralization cell 560 into the anode area 580 and the outlet 572 is configured to permit the chlorine solution to exit the neutralization cell 560 from the cathode area 584.

The neutralization cell 560 also includes an anode guide 590 located in the anode area 580. The anode guide 590 is configured to direct a flow of the chlorine solution from the inlet 570 across a length of the neutralization anode 562. The neutralization cell 560 does not include any guides in the middle area 582 or the cathode area 584. Despite the lack of guides in the middle area 582 and the cathode area 584, the anode guide 590 may direct the flow through the neutralization anode 562 and toward the neutralization cathode 518 to effectively carry out the neutralization reactions and then the flow may direct itself toward the outlet 572.

FIG. 10B depicts a neutralization cell 660 that includes a neutralization anode 662 and a neutralization cathode 618. The neutralization anode 662 and the neutralization cathode 618 are positioned to divide the neutralization cell 660 into three areas: an anode area 680 on a side of the neutralization anode 662 that is furthest from the neutralization cathode 618, a middle area 684 that is between the neutralization anode 662 and the neutralization cathode 618, and a cathode area 682 on a side of the neutralization cathode 618 that is furthest from the neutralization anode 662. The neutralization cell 660 also includes an inlet 670 and an outlet 672. The inlet 670 is configured to permit a chlorine solution to enter the neutralization cell 660 into the anode area 680 and the outlet 672 is configured to permit the chlorine solution to exit the neutralization cell 660 from the cathode area 682.

The neutralization cell 660 also includes an anode guide 690 located in the anode area 680. The anode guide 690 is configured to direct a flow of the chlorine solution from the inlet 670 across a length of the neutralization anode 662. The neutralization cell 660 also includes a cathode guide 692 located in the cathode area 682. The cathode guide 692 is configured to direct a flow of the chlorine solution from across a length of the neutralization cathode 618 toward the outlet 672. The neutralization cell 660 also includes a middle guide 694 located in the middle area 684. The middle guide 694 is configured to direct a flow of the chlorine solution from a length of the neutralization anode 662 across the middle area 684 to a length of the neutralization cathode 618.

Figure 10D:
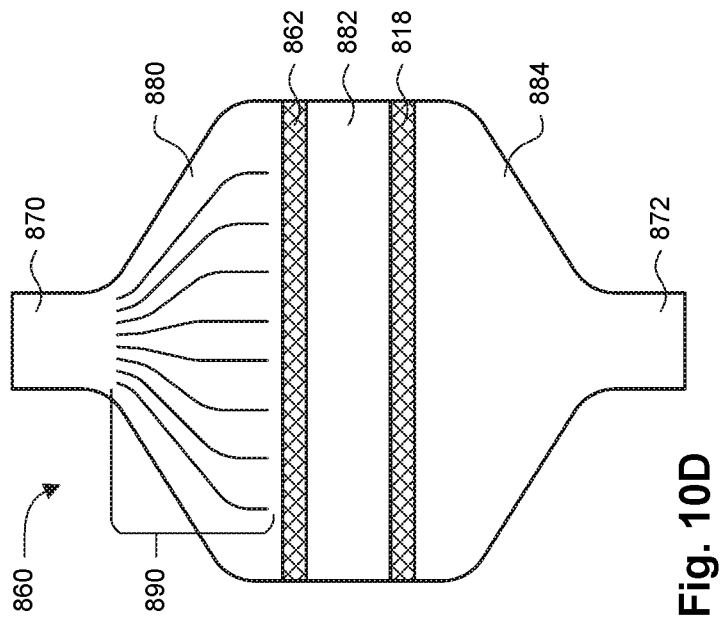
Figure 10C:
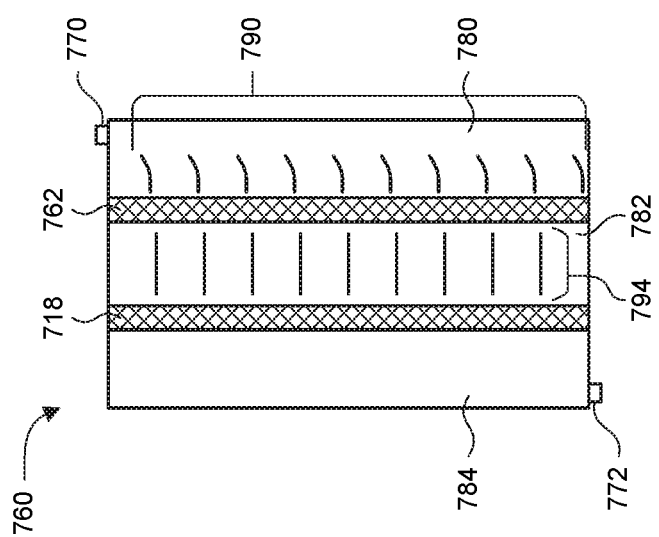

FIG. 10C depicts a neutralization cell 760 that includes a neutralization anode 762 and a neutralization cathode 718. The neutralization anode 762 and the neutralization cathode 718 are positioned to divide the neutralization cell 760 into three areas: an anode area 780 on a side of the neutralization anode 762 that is furthest from the neutralization cathode 718, a middle area 782 that is between the neutralization anode 762 and the neutralization cathode 718, and a cathode area 784 on a side of the neutralization cathode 718 that is furthest from the neutralization anode 762. The neutralization cell 760 also includes an inlet 770 and an outlet 772. The inlet 770 is configured to permit a chlorine solution to enter the neutralization cell 760 into the anode area 780 and the outlet 772 is configured to permit the chlorine solution to exit the neutralization cell 760 from the cathode area 784.

The neutralization cell 760 also includes an anode guide 790 located in the anode area 780. The anode guide 790 is configured to direct a flow of the chlorine solution from the inlet 770 across a length of the neutralization anode 762. The neutralization cell 760 also includes a middle guide 794 located in the middle area 782. The middle guide 794 is configured to direct a flow of the chlorine solution across the middle area 782 from a length of the neutralization anode 762 to the neutralization cathode 718. The neutralization cell 760 does not include any guide in the cathode area 784. Despite the lack of guides in the cathode area 784, the flow may direct itself toward the outlet 772.

FIG. 10D depicts a neutralization cell 860 that includes a neutralization anode 862 and a neutralization cathode 818. The neutralization anode 862 and the neutralization cathode 818 are positioned to divide the neutralization cell 860 into three areas: an anode area 880 on a side of the neutralization anode 862 that is furthest from the neutralization cathode 818, a middle area 882 that is between the neutralization anode 862 and the neutralization cathode 818, and a cathode area 884 on a side of the neutralization cathode 818 that is furthest from the neutralization anode 862. The neutralization cell 860 also includes an inlet 870 and an outlet 872. The inlet 870 is configured to permit a chlorine solution to enter the neutralization cell 860 into the anode area 880 and the outlet 872 is configured to permit the chlorine solution to exit the neutralization cell 860 from the cathode area 884.

The neutralization cell 860 also includes an anode guide 890 located in the anode area 880. The anode guide 890 is configured to direct a flow of the chlorine solution from the inlet 870 across a length of the neutralization anode 862. Like the embodiment of the anode guide 490 of FIG. 8, the anode guide 890 also comprises a plurality of separated projections distributed across a length of the neutralization anode 862. Each projection is oriented approximately perpendicular to, and extending away from, the neutralization anode 862. Each projection also has an end furthest away from the neutralization anode 862 which is curved towards the inlet 870. However, in the depicted embodiment, chlorine solution enters the inlet 870 in a direction approximately perpendicular to the neutralization anode 862 and the anode guide 890 is configured to spread the flow outward (to the left and right in FIG. 10D) across a length of the neutralization anode 862. The neutralization cell 860 does not include any guides in the middle area 882 or the cathode area 884. Despite the lack of guides in the middle area 882 and the cathode area 884, the anode guide 890 may direct the flow through the neutralization anode 862 and toward the neutralization cathode 818 to effectively carry out the neutralization reactions and then the flow may direct itself toward the outlet 872. In the depicted embodiment, the walls of the neutralization cell 860 in the cathode area 884 may themselves direct the flow of chlorine solution in the cathode area 884 toward the outlet 872.

Figure 11:
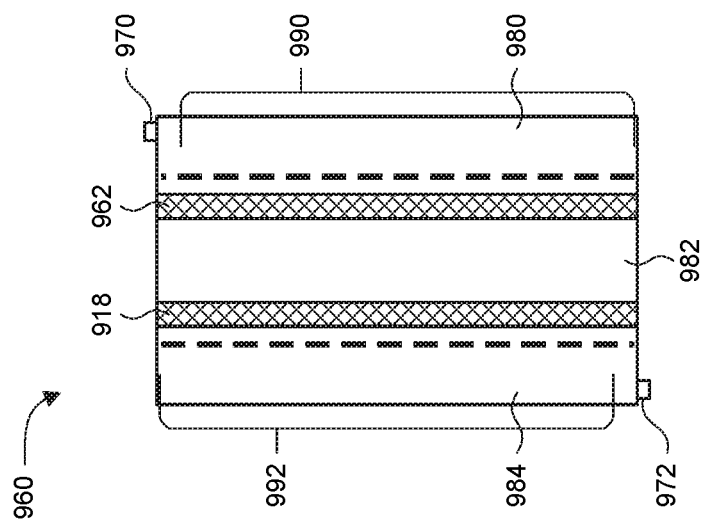
FIG. 11 depicts an embodiment of a neutralization cell with an anode guide and a cathode guide, in accordance with the embodiments disclosed herein.

FIG. 11 shows another embodiment of a neutralization cell 960 which is configured similarly to the neutralization cell 460 of FIG. 8, including a neutralization anode 962, a neutralization cathode 918, an inlet 970, an outlet 972, an anode area 980, a middle area 982, and a cathode area 984. However, the embodiment of FIG. 11 shows another illustrative anode guide 990 and another illustrative cathode guide 992. In this embodiment, the anode guide 990 and the cathode guide 992 may each comprise a perforated (or meshed) separator. The perforated separators are positioned approximately parallel to a surface of the neutralization anode 962 and the neutralization cathode 918, respectively. The perforated separator of the anode guide 990 alters an incoming flow of a chlorine solution from the inlet 970 so as to distribute it across a length of the neutralization anode 962. Specifically, the apertures in the perforated or meshed separator facilitate diversion of the incoming flow towards the neutralization anode 962 across a length of the neutralization anode 962. The perforated or meshed separator of the cathode guide 992 directs an incoming flow of the chlorine solution from across a length of the neutralization cathode 918 into the cathode area 984, where the walls of the neutralization cell 960 effectively direct the chlorine solution towards the outlet 972. In other embodiments, such as that shown in FIG. 10A, the cathode guide 992 need not be included.

Figure 12:
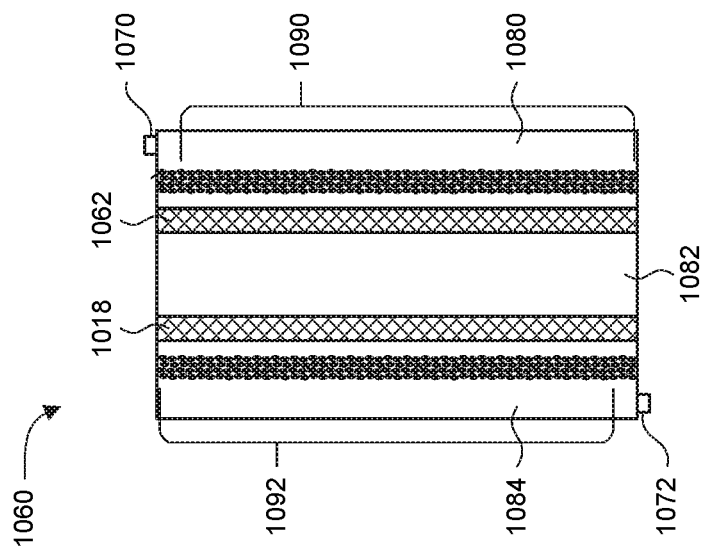
FIG. 12 depicts an embodiment of a neutralization cell with an anode guide and a cathode guide, in accordance with the embodiments disclosed herein.

FIG. 12 shows another embodiment of a neutralization cell 1060 which is configured similarly to the neutralization cell 460 of FIG. 8, including a neutralization anode 1062, a neutralization cathode 1018, an inlet 1070, an outlet 1072, an anode area 1080, a middle area 1082, and a cathode area 1084. However, the embodiment of FIG. 12 shows another illustrative anode guide 1090 and another illustrative cathode guide 1092. In this embodiment, the anode guide 1090 and the cathode guide 1092 may each comprise a plurality of particles (or fibers). The plurality of particles fill at least a portion of the anode area 1080 and the cathode area 1084, respectively. This particle (or fiber) structure of the anode guide 1090 alters an incoming flow of a chlorine solution from the inlet 1070 so as to distribute it across a length of the neutralization anode 1062. Specifically, the pores throughout the particle structure restrict the flow rate and facilitate diversion of the incoming flow towards the neutralization anode 1062 across a length of the neutralization anode 1062. The particle structure of the cathode guide 1092 directs an incoming flow of the chlorine solution from across a length of the neutralization cathode 1018 into the cathode area 1084. The particle structure and/or the walls of the neutralization cell 1060 effectively direct the chlorine solution towards the outlet 1072. In other embodiments, such as that shown in FIG. 10A, the cathode guide 1092 need not be included.

Embodiments of anode guides 590, 690, 790, 890, 990 and 1090 have been described above in the form of projections, a perforated separator, a meshed separator, a particle structure and a fiber structure. Other physical structures such as baffles and grids may be used to achieve the same functions. In some embodiments, the length of a corresponding one of the neutralization anodes 562, 662, 762, 862, 962 and 1062 over which one of the anode guides 590, 690, 790, 890, 990 and 1090 directs the flow is a length in a range from at least half the entire length of the corresponding one of the neutralization anodes 562, 662, 762, 862, 962 and 1062 to the entire length of the corresponding one of the neutralization anodes 562, 662, 762, 862, 962 and 1062. Any one of the anode guides 590, 690, 790, 890, 990 and 1090 can increase the uniformity of the flow of the chlorine solution across the length of a corresponding one of the neutralization anodes 562, 662, 762, 862, 962 and 1062 and in embodiments, the increase can provide a completely uniform flow. However, even without a completely uniform flow, an increase in uniformity can achieve an increase in pH and thus, an increase in the effectiveness of the neutralization.

Embodiments of cathode guides 692, 992 and 1092 have been described above in the form of projections, a perforated separator, a meshed separator, a particle structure and a fiber structure. Other physical structures such as baffles and grids may be used to achieve the same functions. In some embodiments, the length of the corresponding one of the neutralization cathodes 618, 918 and 1018 from which one of the cathode guides 692, 992 and 1092 directs the flow is a length in a range from at least half the entire length of the corresponding one of the neutralization cathodes 618, 918 and 1018 to the entire length of the corresponding one of the neutralization cathodes 618, 918 and 1018.

In some embodiments, the guides described herein may not come into direct contact with the electrode or electrodes near the guides. Using the example in FIG. 8, the anode guide 490 does not come into direct contact with the neutralization anode 462 and the cathode guide 492 does not come into direct contact with the neutralization cathode 418. In some embodiments, the guides described herein are offset from their corresponding electrodes by a predetermined distance. In some examples, the predetermined distance that the guides are offset from their corresponding electrodes is at least 1 mm or greater. If the guides described herein do not come into direct contact with their corresponding electrodes, the surface area of the corresponding electrodes remains exposed. With a greater surface area of the electrodes exposed, the reactions that occur at the surface of the electrodes (e.g., reactions shown in equations (4) and (5)) will occur more readily.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A neutralization cell for increasing a pH level of a chlorine solution, the neutralization cell comprising:
    a neutralization anode;
    a neutralization cathode, wherein the neutralization anode and the neutralization cathode are positioned away from oppositely facing walls of the neutralization cell to divide the neutralization cell into a middle area between the neutralization anode and the neutralization cathode, an anode area between a side of the neutralization anode furthest from the neutralization cathode and one of the oppositely facing walls furthest from the neutralization cathode, and a cathode area between a side of the neutralization cathode furthest from the neutralization anode and the other of the oppositely facing walls;
    an inlet configured to direct a chlorine solution into the neutralization cell by directing an incoming flow of the chlorine solution into the anode area; and
    an outlet configured to direct the chlorine solution out of the neutralization cell by directing an outgoing flow of the chlorine solution from the cathode area,
    wherein the neutralization anode is non-solid and configured to permit the chlorine solution to flow through the neutralization anode from the anode area into the middle area and wherein the neutralization cathode is non-solid and configured to permit the chlorine solution to flow through the neutralization cathode from the middle area into the cathode area.

2. The neutralization cell of claim 1, wherein the neutralization anode is configured to cause a first reaction $2Cl^- \rightarrow Cl_2 + 2e^-$ to occur at or near a surface of the neutralization anode upon powering and wherein the neutralization cathode is configured to cause a second reaction $2H_2O + 2e^- \rightarrow H_2 + 2OH^-$ to occur at or near a surface of the neutralization cathode upon powering.

3. The neutralization cell of claim 1, wherein the non-solid neutralization anode and the non-solid neutralization cathode are configured as at least one of a slotted electrode, a porous electrode, a divided electrode, or a mesh electrode.

4. The neutralization cell of claim 1, further comprising:
an anode guide located in the anode area and configured to direct a flow of the chlorine solution from the inlet across a length of the neutralization anode.

5. The neutralization cell of claim 4, wherein the length of the neutralization anode across which the anode guide directs the flow of the chlorine solution is in a range from at least half an entire length of the neutralization anode to the entire length of the neutralization anode.

6. The neutralization cell of claim 4, wherein the anode guide comprises a plurality of separated projections distributed across the length of the neutralization anode, each projection oriented approximately perpendicular to, and extending away from, the neutralization anode.

7. The neutralization cell of claim 6, wherein each projection has an end furthest from the neutralization anode which is curved towards the inlet.

8. The neutralization cell of claim 4, wherein the anode guide comprises a perforated separator, a meshed separator, baffles, a grid, a plurality of particles, or a plurality of fibers.

9. The neutralization cell of claim 4, wherein the anode guide comprises a perforated or meshed separator positioned approximately parallel to a surface of the neutralization anode or a plurality of particles or fibers filling at least a portion of the anode area.

10. The neutralization cell of claim 4, further comprising:
a cathode guide located in the cathode area and configured to direct a flow of the chlorine solution from across a length of the neutralization cathode toward the outlet.

11. The neutralization cell of claim 10, wherein the cathode guide comprises a plurality of separated projections, a perforated separator, a meshed separator, baffles, a grid, a plurality of particles, or a plurality of fibers.

12. The neutralization cell of claim 10, further comprising:
a middle guide located in the middle area and configured to direct a flow of the chlorine solution across the middle area from the length of the neutralization anode to the length of the neutralization cathode.

13. The neutralization cell of claim 12, wherein the anode guide is located away from the neutralization anode by at least a predetermined distance, the cathode guide is located away from the neutralization cathode by at least the predetermined distance, and the middle guide is located away from each of the neutralization anode and the neutralization cathode by the predetermined distance.

14. The neutralization cell of claim 13, wherein the predetermined distance is about 1 mm.

15. An electrochemical activation system comprising the neutralization cell of claim 1, and a chamber cell separated from the neutralization cell, the chamber cell comprising an anode chamber and a cathode chamber and configured to generate the incoming flow of the chlorine solution into the inlet via electrolysis.

16. The neutralization cell of claim 1, wherein the non-solid neutralization anode and the non-solid neutralization cathode are each configured as a porous electrode.

17. A method of increasing a pH level of a chlorine solution, the method comprising:
causing a flow of a chlorine solution to pass through a neutralization cell comprising a neutralization anode and a neutralization cathode, wherein the flow of the chlorine solution enters the neutralization cell in an anode area on a side of the neutralization anode furthest from the neutralization cathode, passes through the neutralization anode, passes through a middle area between the neutralization anode and the neutralization cathode, passes through the neutralization cathode, and exits the neutralization cell from a cathode area on a side of the neutralization cathode furthest from the neutralization anode; and
powering the neutralization anode and the neutralization cathode while causing the flow of the chlorine solution, thereby increasing a pH level of the chlorine solution.

18. The method of claim 17, wherein powering the neutralization anode and the neutralization cathode causes a first reaction $2Cl^- \rightarrow Cl_2 + 2e^-$ to occur at or near a surface of the neutralization anode and a second reaction $2H_2O + 2e^- \rightarrow H_2 + 2OH^-$ to occur at or near a surface of the neutralization cathode.

19. The method of claim 18, wherein products of the first and second reactions permit reactions to occur in the neutralization cell as follows:

$$Cl_2 + 2OH^- \rightarrow ClO^- + H_2O;\text{ and}$$

$$H^+ + OH^- \rightarrow H_2O.$$

20. The method of claim 17, further comprising generating the flow of the chlorine solution entering the neutralization cell via electrolysis in a chamber cell separated from the neutralization cell, the chamber cell comprising an anode chamber and a cathode chamber.

* * * * *